3,515,679
METAL CONTAINING CATALYSTS AND PREPARATION
Rudolf H. Gaeth, Lake Jackson, Tex., and Bert Horvath, Bartlesville, Okla., assignors to Phillips Petroleum Company, a corporation of Delaware
No Drawing. Filed Nov. 29, 1967, Ser. No. 686,753
Int. Cl. B01j *11/58, 11/22*
U.S. Cl. 252—454                                9 Claims

ABSTRACT OF THE DISCLOSURE

Supported metal catalysts or catalytic components are prepared by vaporizing a metal in the presence of a catalyst support material by the application of electrical energy.

---

This invention relates to metal containing catalysts. In one aspect it relates to a method of catalyst preparation.

For promoting chemical processes, many different catalytic agents have been employed with varying success. One effective catalyst for many different processes is that of a metal or metal oxide carried upon a support material such as silica or alumina.

One method of catalyst preparation consists of impregnating the support material with a transition metal component by immersing the carrier in the form of granules or pellets in a solution of a soluble salt of the metal. Another method utilizes coprecipitation of a hydrated oxide of the carrier and a hydrated oxide of the metal. Both of these solution techniques involve drying and calcining steps to obtain a satisfactory catalyst. A third method of catalyst preparation comprises flame spraying the metal onto the support material in the form of a thin coating or layer.

The cost of solution techniques of catalyst preparation is increased by the additional steps necessary to obtain a dry catalyst. Flame spraying methods are difficult to control and involve the use of expensive apparatus.

Accordingly it is an object of the invention to provide an improved method of preparing catalysts and catalyst components.

Another object of the invention is to reduce the cost of preparing supported metal catalysts.

These and other objects of the invention will be apparent to one skilled in the art upon consideration of the following disclosure and appended claims.

According to the invention, there is provided a method of preparing a supported finely divided metal catalyst comprising vaporizing one or more metals or oxides of the metal in the presence of a particulate catalyst support material by the application to the metal or metal oxide of a voltage and current at a pulse rate sufficient to disintegrate the metal or metal oxide. Generally, these conditions are in the range of about 1000 to 100,000 volts and current in the range of about 1 to 10 amperes at a pulse rate in the range of about 10 to 1000 pulses per second and will depend on the type, size and configuration of the metal or metal oxide wire or filament. It is also possible to use a direct current (zero pulse rate) to achieve the disintegration. The oxides of metals and mixtures of the oxides and metals can be deposited on conventional support materials by the practice of the invention. The metal, metal oxides or mixtures thereof can be in the form of a wire or filament which is connected between the electrodes of a voltage source.

Utilizing the process of the invention, an active form of very finely divided metal or metals is deposited on the catalyst support material. Ionization occurs in addition to vaporization and the ionized material is capable of reacting with the support material in a manner that is not possible by ordinary chemical reaction methods of catalyst preparation. The products obtained by the process of the invention are uniform nonpyrophoric powders or granulated materials which are active as catalysts in themselves or which can be used as components in catalyst systems.

Metals employed in the process of the invention are metals of Groups I–B, II–B, IIIA, III–B, IV–A, IV–B, V–B, VI–B, VII–B, and VIII of the Periodic Table of Elements, according to Handbook of Chemistry and Physics, Chemical Rubber Company, 45th edition, page B–2. The preferred metals utilized as the active components of the catalysts are chromium, molybdenum, tungsten, nickel, cobalt, rhenium, titanium, vanadium, gallium, tin, indium, and alloys of these metals. Support material for the finely divided metals include materials such as silica, alumina, silica-alumina, activated charcoal, diatomaceous earth, clays, such as bentonite, steel, iron, asbestos, pumice, thoria, titania, boria, and the like.

Vaporization and ionization of the metal can be effected under a vacuum or in an inert, oxidizing, or reducing environment, for example the vaporization can be carried out in an oxygen, hydrogen, carbon monoxide, nitric oxide or rare gas atmosphere. Any suitable source of power such as a conventional high voltage power source able to operate continuously or intermittently (pulsing) can be employed for the vaporization of the metals. The amount of metal deposited is controlled by regulating the voltage pulse rate configuration and size of the metal filament, amount of catalyst support and particle size of the catalyst support. A fluoridized bed can be produced during the period when the metallic filament is vaporized thus dispersing the metal in intimate contact with the support material.

In one embodiment of the invention the metal to be vaporized is suspended above the support material. In another embodiment, the wire or metal is contacted with the support material by embedding the metal in the granular material. For example, a chromium wire can be embedded in powdered alumina and vaporized to provide a very active cracking catalyst.

The following examples will serve to illustrate the invention.

EXAMPLE I

Runs were made, using the process of the invention, for depositing finely divided transition metals on a silica gel support material. The wire to be vaporized was embedded in a bed of silica gel which was placed in a modified desiccator provided with two electrodes and a means for evacuation. The system was evacuated with an oil pump and operated at 5000 volts, a current of 1 ampere, and at 60 pulses per second. The power supply was a high voltage power source with a maximum output of 13,000 volts and 6 amperes averaged over one second. The time was in the range of 1–10 seconds. Runs were made using metals as follows:

(1) A 3-inch length of 0.02 inch diameter molybdenum wire;

(2) A 3-inch length of 0.02 inch diameter molybdenum wire and a 3-inch length of 0.01 inch diameter vanadium wire, twisted together;

(3) A 2-inch length of 0.01 inch diameter nickel wire.

The products of these runs were nonpyrophoric gray powders and were uniform in appearance.

EXAMPLE II

A portion of the product from run 1 of Example I, finely divided molybdenum on silica gel, was transferred to a reactor, pressured to 30 p.s.i.g. with nitrogen oxide, and maintained in contact with the nitrogen oxide at room temperature for 10 minutes. The nitrogen oxide was vented and 200 ml. of cyclohexane were added followed by 10 grams of propylene and 2 gram millimoles of methylaluminum sesquichloride. This mixture was agitated at room temperature for 30 minutes. A chromatographic analysis showed that ethylene was present in the gas phase of the reaction mixture. This shows that disproportionation of propylene occurred and that finely divided molybdenum deposited on silica gel of the invention is an active catalyst component.

EXAMPLE III

A portion of the product from run 2 of Example I, finely divided molybdenum and vanadium deposited on silica gel, was transferred to a reactor, pressured to 30 p.s.i.g. with nitrogen oxide and maintained in contact with nitrogen oxide at room temperature for 10 minutes. The nitrogen oxide was vented and 200 ml. of cyclohexane were added followed by 10 grams of propylene and 2 gram millimoles of methylaluminum sesquichloride. The mixture was allowed to stand overnight at room temperature.

A small amount of polymer which was insoluble in cyclohexane was formed, demonstrating the molybdenum and vanadium deposited on silica gel by the method of the invention as being an active catalyst component for proplyene polymerization.

EXAMPLE IV

A portion of the product from run 3 of Example I, finely divided nickel deposited on silica gel, was transferred to a quart reactor; 500 ml. of cyclohexane was added, followed by 50 grams of 1,3-butadiene and 5 gram millimoles of boron trifluoride etherate. The reaction mixture was maintained at 70° C. for 16 hours. An oily polymer was produced.

This demonstrates that the finely divided nickel deposited on silica gel by the method of the invention functions as a catalyst component for the polymerization of butadiene.

Reasonable modification and variation are within the scope of the invention which sets forth a novel method of preparing catalyst and catalyst components.

That which is claimed is:

1. A method of producing a supported metal catalyst comprising vaporizing a metal in the presence of a particulate support material by the application to said metal of voltage in the range of about 1000 to 100,000 volts and current in the range of about 1 to 10 amperes at a pulse rate in the range of about 0 to 100 pulses per second; said metal being selected from the group consisting of elements from Groups I–B, II–B, III–A, III–B, IV–A, IV–B, V–B, VI–B, VII–B, and VIII of the Periodic Table of Elements, the oxides of each of the listed elements and mixtures thereof; and said support material being selected from the group consisting of silica, alumina, activated charcoal, bentonite, thoria, titania and boria.

2. The method of claim 1 wherein said metal is in contact with said support material.

3. The method of claim 1 wherein said metal is vaporized in the presence of said support material in an inert environment.

4. The method of claim 1 wherein said metal is vaporized in the presence of said support material in an oxidizing environment.

5. The method of claim 1 wherein said metal is vaporized in the presence of said support material in a reducing environment.

6. The method of claim 1 wherein said metal is in the form of a wire or filament.

7. The method of claim 1 wherein said metal is selected from the group consisting of nickel, molybdenum and vanadium and said support material comprises silica gel.

8. The method of claim 6 wherein at least two wires comprised of different metals are twisted together and the resulting supported metal catalyst comprises both of said metals supported on the support material.

9. The process of claim 1 wherein a fluidized bed of the support material is produced during the period when the metal is vaporized.

References Cited

UNITED STATES PATENTS

| | | | |
|---|---|---|---|
| 2,993,266 | 7/1961 | Berry | 204—192 X |
| 3,166,537 | 1/1965 | Gregg et al. | 252—454 X |
| 3,177,134 | 4/1965 | Gartner et al. | 204—192 |
| 3,189,560 | 6/1965 | Graham | 252—447 |
| 3,264,226 | 8/1966 | Johnson | 252—454 X |

DANIEL E. WYMAN, Primary Examiner

C. F. DEES, Assistant Examiner

U.S. Cl. X.R.

252—456, 458, 459, 447, 477, 432